United States Patent Office 2,803,157
Patented Aug. 20, 1957

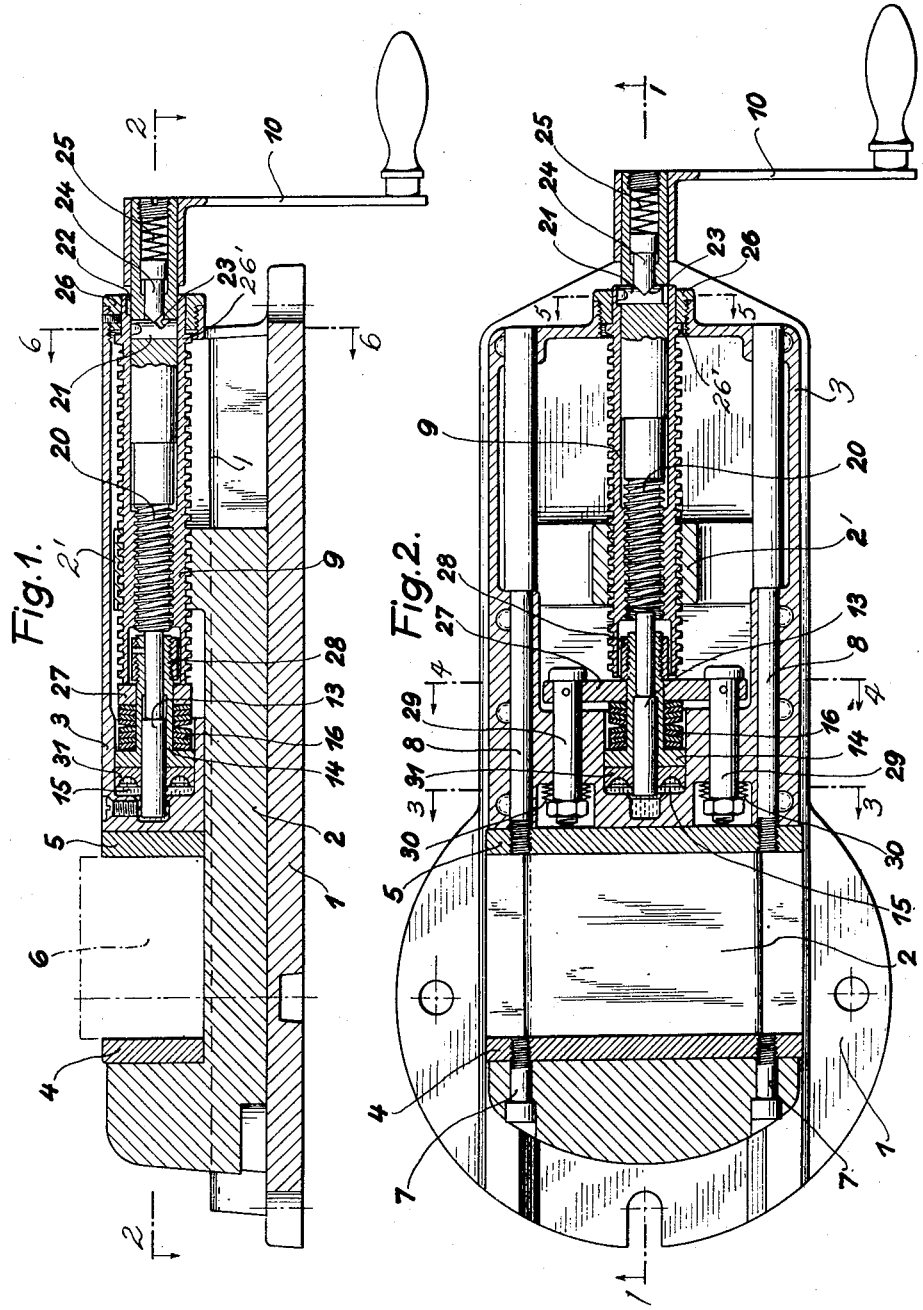

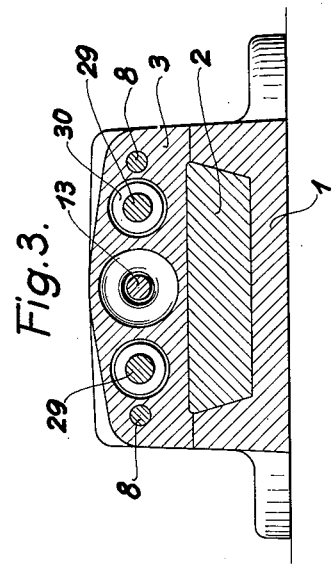
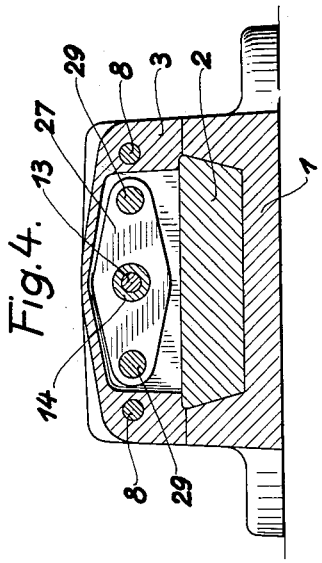
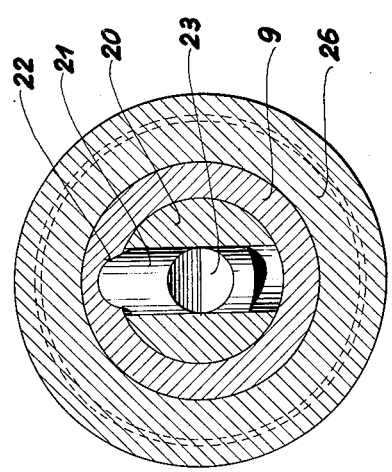
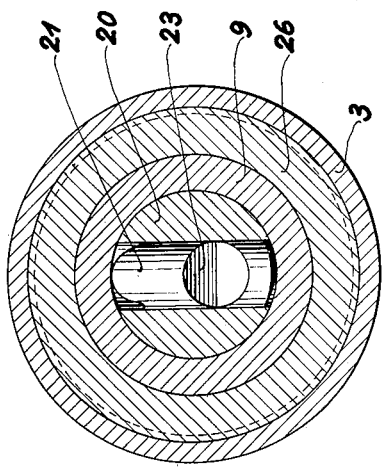

2,803,157

HOLDING DEVICE HAVING SCREW AND HYDRAULIC PRESSURE-APPLYING MEANS SEQUENTIALLY EXERTED

Karl Seitter, Koln-Dellbruck, Germany

Application July 30, 1952, Serial No. 301,637

6 Claims. (Cl. 81—17.2)

The invention refers to a mechanical-hydraulic chucking device, to be used, for example, on machine and bench vises, lathe chucks, two and three jaw chucks, chucks for roll lathes and similar equipment having chucks. The familiar chuck with self-arresting screw drive, for example machine and bench screw vises, multiple jaw chucks, and the like, have the disadvantage that the gear ratio is the same, whether under load or not under load, and further, great friction losses occur in such drives. Hence, with high chucking pressures it is often necessary to provide an extension for the crank or to tighten the chuck with a hammer. Of course, expensive air-pressure and hydraulic chucks have been developed for series type production, but they cannot be used for custom work and the limited series production of the ordinary machine shop, and they also are too expensive as to their initial cost.

In order to remedy this situation and create a simple and inexpensive chucking device, it is proposed, in accordance with the invention, to provide the engaging and disengaging movement of the jaw faces, and the like, by means of a coarse but nevertheless self-arresting screw thread spindle and the chucking pressure by means of high hydraulic pressure with a higher scaled ratio for the transfer of power. This results in a simplified construction of the chucking device with a greater ease of operation.

In its practical embodiment, such a chucking device may be provided with a coupling which, upon the application of pressure, disconnects the power-transmitting connection between the coarse-threaded spindle and the hydraulic element for producing the chucking pressure. Thus a special operation in changing over from the engaging and disengaging movement to the application of the chucking pressure is not necessary, since the coupling is released automatically. In order to obtain a so-called post-release pressure, a flexible intermediate member can be inserted into the chuck mechanism, for example, a series of cup springs.

Furthermore, in accordance with the invention, it is suggested that, in addition to the series of cup springs acting on the piston boss bushing of the high-pressure hydraulic system, springs giving pre-engagement pressure also may be provided. These pre-engagement pressure cup springs may operate, as an example, by means of guide bolts, upon a bridge piece, which abuts the cup spring assembly. By means of this pre-engagement pressure, an effect is produced whereby the pressure medium of the high-pressure hydraulic system remains under a certain pressure even in the released position of the chucking device, and thus the pressure-sealing joints or gaskets are always seated firmly in position. In this way, losses through leakage of the pressure medium are avoided by the simplest means. Additionally, by means of these pre-engagement pressure springs, a smooth-working return movement of the pressure piston is attained, since the necessary pressure is maintained in the pressure chamber by means of the springs.

Furthermore, the pressure piston which is inserted in the piston boss bushing, which bushing in turn is under pre-engagement pressure, can be operated by a piston spindle which is provided with a ratchet bolt and pawl bolt for coupling with the hollow spindle. By this means, it is possible to place the coupling elements within the hollow spindle and they are thereby well protected against dirt.

In the drawing there is illustrated an example of an embodiment of a chucking device in accordance with the invention, wherein:

Fig. 1 is a longitudinal section of a closed vise (in operative position, under pressure) along the line 1—1 of Fig. 2.

Fig. 2 is a horizontal section along the line 2—2 of Fig. 1, but shows the vise mechanism in non-clamping position.

Fig. 3 is a cross-section along the line 3—3 of Fig. 2.

Fig. 4 is a section along the line 4—4 of Fig. 2.

Fig. 5 is a section along the line 5—5 of Fig. 2, and

Fig. 6 is a section along the line 6—6 of Fig. 1.

The chucking device exemplified as a supporting vise consists of a base part 1, a supporting slide 2, and an upper stationary or fixed part 3. The supporting slide carries an interchangeable jaw 4, and the upper part 3 a similar interchangeable jaw 5, so that by means of these jaws a work piece 6 can be held under pressure. As an example, the jaw 4 is held by two screws 7, and the jaw 5 by two screws 8.

On the upper part 3 is mounted a hollow spindle or shaft 9 having an external coarse thread which engages with a corresponding internal thread of a nut 2' provided on an upwardly extended portion of the supporting slide 2. At the end of the hollow spindle 9 is located a crank or handle 10, which is connected with a piston-actuated spindle or shaft 20. The shaft 20 is within the hollow shaft 9 and is provided with a male threaded zone which engages a female threaded zone of the hollow shaft as shown in Figs. 1 and 2. In this shaft 20 there is inserted, as a coupling, a transversely mounted ratchet bolt 21 which extends into a corresponding recess 22 of the hollow spindle 9 (Fig. 5). A pawl bolt 24, which is under the pressure of a spring 25, engages in a wedge-shaped notch 23 of this ratchet bolt (Fig. 2). The hollow spindle 9 is guided at its outer or rear end by a bushing 26, an annular stop flange 26' being provided on the spindle near said outer end to limit rearward movement of the spindle. This construction provides part of a lost motion connection between the spindle 9 and the stationary portions 1 and 3 of the vise.

A series of pre-engagement pressure cup springs 16 could be placed between a piston boss bushing 14 and a forward end face of the hollow spindle 9. Preferably, the series of cup springs 16 bears on one side against a bridge piece 27, which is slidably attached to a hollow extension of the piston boss bushing 14 by a nut 28 that extends slidably into the forward end of the hollow spindle 9. The bridge piece 27 carries two guide bolts 29 which serve to mount two pre-engagement pressure springs 30. These pre-engagement pressure springs, through their linkage, exert pressure tending to force a sealing collar 31 and the piston boss bushing 14 to slide to the left, which in turn maintains a pressure medium in a cylinder 15 under pressure, whereby a smoothly operating joint is attained.

In order to clamp the work piece 6, the crank 10 is turned clockwise in the usual manner. The hollow spindle 9 is turned by means of the ratchet bolt 21 which couples the shaft 20 to said hollow spindle. Thus, in making the first adjustment, the shaft 20 and the hollow spindle 9 rotate as a unit, the hollow spindle screwing into the coarse threaded nut 2' a short distance, or until the forward end face of the hollow spindle (the left end face as viewed in Figs. 1 and 2) abuts the bridge piece 27 (see Fig. 1), after which said nut 2' threads onto the hollow spindle 9 and displaces the supporting slide to the right. Fig. 2 shows a small gap between the bridge piece 27 and the forward end of the hollow spindle 9 which represents said short distance traveled by said hollow spindle before said nut 2' starts threading onto the hollow spindle, and which provides another part of the previously mentioned lost motion connection between the spindle 9 and the stationary portions 1 and 3 of the vise. When the work piece 6 is placed under moderate pressure, corresponding to that force required for rotation of the ratchet bolt 21 to displace the spring-pressed pawl 24, the ratchet bolt 21 leaves the recess 22 and then the piston-operating shaft 20 alone continues to turn. As a result, the shaft 20 is displaced to the left and forces a piston 13 into the cylinder 15, whereby the piston boss bushing 14 is displaced to the right and thereby displaces the bridge piece 27 to the right so that it bears upon the frontal surface of the hollow spindle 9, this displacement of the bridge piece 27 also serving, through the bolts 29, 29 to compress the springs 30, 30. Thus, the structure so far described constitutes a high pressure hydraulic system having a transmission ratio equal to the frontal surface area of the piston 13 divided into the ring surface area of the piston boss bushing 14. The displacement of the bridge piece 27 to the right causes the abutting hollow spindle 9, as well as the supporting slide 2, to be displaced a short distance to the right, or until the stop flange 26' on its rear end abuts the stationary guide bushing 26, and the work piece 6 is thereby placed under final clamping pressure, without requiring the rotation of the hollow spindle 9.

To unclamp the workpiece, the crank 10 is first turned counterclockwise to screw the piston-actuating shaft 20 back until the ratchet bolt 21 again moves into the recess 22. This releases the hydraulic pressure and decompresses the springs 16 and 30. During subsequent screwing back, the hollow spindle 9 and the shaft 20 turn as a unit, so that the nut 2' unthreads to the left along the spindle 9 and correspondingly displaces the slide 2 and the movable jaw 4 to release the workpiece 6.

The ratio of transmission of the high pressure hydraulic system can be selected according to preference, for example, from :12 to 1:16 to 1. It is advantageous to design the outer thread of the hollow spindle 9 as a coarse trapezoid-shaped work, which gives a rapid movement. Experiments have shown that in using the chuck there is required only approximately 1/50 of the moment of rotation needed for simple screw driven chucks.

By means of the series of cup springs 16, a so-called post-release pressure is obtained, that is, with a slight loosening of the work piece 6 between the jaws 4 and 5, the springs 16 still exert pressure so that, as in the case of an air-pressure chuck, the pressure remains constant in contrast to a purely mechanical chuck.

In order to obtain a working seat free from any play for the movable clamping jaws, as for example, in Figure 3, the chuck base, as there illustrated, may be provided with a trapezoid-shaped guide for the cross slide 2 in the vise base 1.

I claim:

1. A clamping device comprising a fixed clamping member, a movable clamping member, a turnable coarse-threaded first shaft, means defining a lost motion connection between said first shaft and said fixed member, a self-arresting threaded connection between the first shaft and the movable member, a hand driven turnable second shaft, said second shaft being concentrically arranged within a central bore provided in the first shaft, a male threaded portion on the second shaft engaging a female threaded portion of the first shaft, an elastic coupling means rigidly connecting said shafts for rotation as a unit but interrupting said connection automatically in response to a predetermined resistance to rotation encountered by said first shaft, a hydraulic unit having a fluid-filled chamber within said fixed member, a main piston bearing against said first shaft and adapted to move said first shaft within the range of its lost motion when the connection with said second shaft is interrupted, and a second piston of substantially less pressing surface than said main piston, said second piston being connected mechanically with the second shaft and connected hydraulically with the main piston.

2. A clamping device comprising a fixed clamping member, a movable clamping member, a turnable coarse-threaded first shaft, means defining a lost motion connection between said first shaft and said fixed member, a self-arresting threaded connection between the first shaft and the movable member, a hand driven turnable second shaft, an elastic coupling means rigidly connecting said shafts for rotation as a unit but interrupting said connection automatically in response to a predetermined resistance to rotation encountered by said first shaft, a hydraulic unit having a fluid-filled chamber within said fixed member, a main piston bearing against said first shaft and adapted to move said first shaft within the range of its lost motion when the connection with said second shaft is interrupted, a second piston of substantially less pressing surface than said main piston, said second piston being connected mechanically with the second shaft and connected hydraulically with the main piston, and an elastic means defined by a series of cup springs slidably arranged on an extension of the main piston between a rear side thereof and a forward end of the first shaft.

3. A clamping device comprising a fixed clamping member, a movable clamping member, a turnable coarse-threaded first shaft, means defining a lost motion connection between said first shaft and said fixed member, a self-arresting threaded connection between the first shaft and the movable member, a hand driven turnable second shaft, an elastic coupling means rigidly connecting said shafts for rotation as a unit but interrupting said connection automatically in response to a predetermined resistance to rotation encountered by said first shaft, a hydraulic unit having a fluid-filled chamber within said fixed member, a main piston bearing against said first shaft and adapted to move said first shaft within the range of its lost motion when the connection with said second shaft is interrupted, a second piston of substantially less pressing surface than said main piston, said second piston being connected mechanically with the second shaft and connected hydraulically with the main piston, a bridge piece slidable within the fixed clamping member coaxially of the first shaft and abutting a forward end thereof, and spring-pressed bolts slidable within said fixed member in directions parallel to the first shaft for pressing said bridge piece with a predetermined and regulable pressure against a rear side of the main piston.

4. A clamping device comprising a fixed clamping member, a movable clamping member, a turnable coarse-threaded first shaft, means defining a lost motion connection between said first shaft and said fixed member, a self-arresting threaded connection between the first shaft and the movable member, a hand driven turnable second shaft, an elastic coupling means rigidly connecting said shafts for rotation as a unit but interrupting said connection automatically in response to a predetermined resistance to rotation encountered by said first shaft, said elastic coupling means including a cross bolt slidable within said second shaft and adapted to engage a recess in the first shaft, the cross bolt having a wedge-shaped recess therein and a spring-actuated bolt slidable within the second shaft coaxially thereto and adapted to engage the recess in the cross bolt under the action of the spring, the cross bolt being adapted to disengage the first shaft in response to said predetermined resistance to rotation encountered thereby, a hydraulic unit having a fluid-filled chamber within said fixed member, a main piston bearing against said first shaft and adapted to move said first shaft within the range of its lost motion when the connection with said second shaft is interrupted, and a second piston of substantially less pressing surface than the main piston, said second piston being connected mechanically with the second shaft and connected hydraulically with the main piston.

5. A clamping device comprising a fixed clamping member, a slide, a movable clamping member rigidly attached to the slide, a turnable coarse-threaded first shaft, the slide having a trapezoid cross-section and being in threaded engagement with the first shaft, the slide being slidable in a direction parallel to said first shaft and being free from any play in a recess of similar trapezoid cross-section formed in the fixed clamping member, means defining a lost motion connection between the first shaft and the fixed member, a self-arresting threaded connection between the first shaft and the movable member, a hand driven turnable second shaft, an elastic coupling means rigidly connecting said shafts together for rotation as a unit but interrupting said connection automatically in response to a predetermined resistance encountered by said first shaft, a hydraulic unit having a fluid-filled chamber within said fixed member, a main piston bearing against said first shaft and adapted to move said first shaft within the range of its lost motion when the connection with said second shaft is interrupted, and a second piston of substantially less pressing surface than said main piston, said second piston being connected mechanically with the second shaft and connected hydraulically with the main piston.

6. A clamping device comprising a fixed clamping member, a slide of trapezoid cross-section slidable free from any play within the fixed member, a movable clamping member rigidly attached to said slide, a hollow coarse threaded shaft in self-arresting threaded engagement with a female threaded and upwardly extending portion of the slide, an inner shaft arranged coaxially and concentrically to the hollow shaft within a central bore thereof, a male threaded portion on the inner shaft engaging a female threaded portion of the hollow shaft, an elastic coupling means adapted to rigidly connect the hollow and inner shafts and to interrupt said connection automatically in response to a predetermined force applied to the hollow shaft, means defining a lost motion connection between the hollow shaft and the fixed member, a hydraulic unit having a fluid-filled chamber, a main piston, a bridge piece mounted on said piston and bearing against a forward end of the hollow shaft and adapted to move the hollow shaft within the range of its lost motion when said connection with the inner shaft is interrupted, a second piston connected with a forward end of the inner shaft and arranged within a central bore formed in the main piston and an extension thereof, said second piston having a substantially less pressing surface than the main piston and being adapted to protrude from the main piston into said chamber, at least one spring slidable on the extension of the main piston between a rear side of the main piston and the forward end of the hollow shaft, said elastic coupling means and hydraulic unit being fully located within an upper portion of the fixed member above the slide, an outer end only of the inner shaft protruding from said fixed member and a crank connected to the outer end of the inner shaft.

References Cited in the file of this patent

UNITED STATES PATENTS

| 1,018,035 | De Leeuw | Feb. 10, 1912 |
| 2,238,583 | Dodge | Apr. 15, 1941 |
| 2,327,920 | Moohl | Aug. 24, 1943 |
| 2,345,401 | Lindegren | Mar. 28, 1944 |
| 2,402,411 | Kent | June 18, 1946 |
| 2,492,338 | Vickers | Dec. 27, 1949 |
| 2,509,991 | Schenke | May 30, 1950 |

FOREIGN PATENTS

| 546,518 | Great Britain | July 16, 1942 |
| 965,788 | France | Feb. 22, 1950 |